(12) United States Patent
Peng et al.

(10) Patent No.: US 10,301,150 B2
(45) Date of Patent: May 28, 2019

(54) SHOCK-ABSORBING AND ENERGY-COLLECTING ROLLER CAGE SHOE

(71) Applicant: CHINA UNIVERSITY OF MINING AND TECHNOLOGY, Jiangsu (CN)

(72) Inventors: Yuxing Peng, Jiangsu (CN); Yadong Wang, Jiangsu (CN); Zhencai Zhu, Jiangsu (CN); Gongbo Zhou, Jiangsu (CN); Zhiyuan Shi, Jiangsu (CN); Guohua Cao, Jiangsu (CN); Songyong Liu, Jiangsu (CN); Wei Li, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 36 days.

(21) Appl. No.: 15/547,517

(22) PCT Filed: Dec. 7, 2016

(86) PCT No.: PCT/CN2016/108879
§ 371 (c)(1),
(2) Date: Jul. 31, 2017

(87) PCT Pub. No.: WO2017/128866
PCT Pub. Date: Aug. 3, 2017

(65) Prior Publication Data
US 2018/0118517 A1 May 3, 2018

(30) Foreign Application Priority Data
Jan. 27, 2016 (CN) .......................... 2016 1 0054694

(51) Int. Cl.
*B66B 7/04* (2006.01)
*F16F 7/14* (2006.01)
(Continued)

(52) U.S. Cl.
CPC .............. *B66B 7/048* (2013.01); *B66B 11/00* (2013.01); *F16F 7/14* (2013.01); *H02N 2/186* (2013.01)

(58) Field of Classification Search
CPC ......... B66B 7/046; B66B 7/048; B66B 11/00; F16F 7/00; F16F 7/14
See application file for complete search history.

(56) References Cited

U.S. PATENT DOCUMENTS 2,253,820 A * 8/1941 Spiro ...................... B66B 7/046
187/410
3,329,240 A * 7/1967 Harwood ................ B66B 7/046
187/410
(Continued)

FOREIGN PATENT DOCUMENTS

CN 2400301 10/2000
CN 2560790 7/2003
(Continued)

OTHER PUBLICATIONS

Mahine Translation of CN 2855985.*

*Primary Examiner* — Diem M Tran
(74) *Attorney, Agent, or Firm* — JCIPRNET

(57) ABSTRACT

A shock-absorbing and energy-collecting roller cage shoe including a base, a main energy-collecting module, two auxiliary energy-collecting modules, and a roller is provided. The base is provided with three containing spaces for containing the main energy-collecting module and the two auxiliary energy-collecting modules. In the three containing spaces, the main energy-collecting module and the two auxiliary energy-collecting modules are respectively connected fixedly to the base through wire rope shock absorbers, the main energy-collecting module and the two auxiliary energy-collecting modules are respectively pressed on the left side, the upper side and the lower side of the roller, and the right side of the roller is pressed on a cage guide. The energy-collecting modules collect vibrational energy generated by vibration in the operation process of a lifting container, and convert the vibrational energy into collectable
(Continued)

piezoelectric energy. The piezoelectric energy can be used to supply electric energy to electricity-consuming installations, such as such as the illumination of the lifting container, and thereby the collection and utilization of energy are realized.

4 Claims, 5 Drawing Sheets

(51) Int. Cl.
*H02N 2/18* (2006.01)
*B66B 11/00* (2006.01)

(56) References Cited

U.S. PATENT DOCUMENTS

| | | | |
|---|---|---|---|
| 5,107,963 A * | 4/1992 | Rocca | B66B 7/048 |
| | | | 187/410 |
| 7,562,749 B2 | 7/2009 | Race, Sr. et al. | |
| 2015/0321885 A1* | 11/2015 | Laughton | B66B 7/048 |
| | | | 187/410 |

FOREIGN PATENT DOCUMENTS

| | | | | |
|---|---|---|---|---|
| CN | 2855985 | | 1/2007 | |
| CN | 201080397 | | 7/2008 | |
| CN | 102052419 | | 5/2011 | |
| CN | 104158437 | | 11/2014 | |
| CN | 104192672 | | 12/2014 | |
| CN | 105540384 | | 5/2016 | |
| JP | H07144846 | | 6/1995 | |
| JP | H07176449 | | 7/1995 | |
| JP | 2005126163 A * | | 5/2005 | ............ B66B 7/046 |
| JP | 2006131385 | | 5/2006 | |
| JP | 2007146976 | | 6/2007 | |

\* cited by examiner

SHOCK-ABSORBING AND ENERGY-COLLECTING ROLLER CAGE SHOE

CROSS-REFERENCE TO RELATED APPLICATION

This application is a 371 application of the International PCT application serial no. PCT/CN2016/108879, filed on Dec. 7, 2016, which claims the priority benefit of China application no. 201610054694.6, filed on Jan. 27, 2016. The entirety of each of the abovementioned patent applications is hereby incorporated by reference herein and made a part of this specification.

BACKGROUND

Technical Field

The present invention relates to a novel roller cage shoe which is used on a lifting container and plays the role of guiding, shock absorption and energy collection when running along a cage guide.

Related Art

At present, shock absorbers of ordinary roller cage shoes use springs as shock-absorbing and bearing parts, the stiffness coefficient of the springs is a fixed value, the shock-absorbing effect generated by the springs changes linearly, and as a result, the shock-absorbing effect of the springs is unsatisfactory when the springs bear great transverse vibration. Wire rope shock absorbers used by the present invention can effectively solve this problem, the stiffness coefficient of the wire rope shock absorbers is a non-fixed value, the stiffness coefficient can increase as transverse vibration increases, and therefore the shock-absorbing effect of the wire rope shock absorbers is better than that of the existing ordinary roller cage shoes when the wire rope shock absorbers bear great transverse vibration. Moreover, at present, electricity-consuming installations in a lifting container usually need an additional power supply, such as lithium batteries, to satisfy the operation of the internal electricity-consuming installations, so conventional lifting containers cannot be self-contained.

SUMMARY

The technical problem to be solved by the present invention is to provide a shock-absorbing and energy-collecting roller cage shoe aiming at the defect of the prior art.

The technical solution of the present invention is as follows:

Disclosed is a shock-absorbing and energy-collecting roller cage shoe, which includes a base (7), a main energy-collecting module (6), two auxiliary energy-collecting modules (10), and a roller (11), wherein the base (7) is provided with three containing spaces for containing the main energy-collecting module (6) and the two auxiliary energy-collecting modules (10), in the three containing spaces, the main energy-collecting module (6) and the two auxiliary energy-collecting modules (10) are respectively connected fixedly to the base (7) through a plurality of wire rope shock absorbers, the main energy-collecting module (6) and the two auxiliary energy-collecting modules (10) are respectively pressed on the left side, the upper side and the lower side of the roller (11), and the right side of the roller (11) is pressed on a cage guide (22).

In the shock-absorbing and energy-collecting roller cage shoe, each of the main energy-collecting module (6) and the two auxiliary energy-collecting modules (10) includes a top cover (14), a plurality of silicon rubber pads, a plurality of piezoelectric ceramic plates (17), an internal box (18), a plurality of belleville springs (19), and a bottom cover (20), the bottom of the internal box (18) is provided with a cavity, a bottom layer of silicon rubber pad, the piezoelectric ceramic plates (17) and an upper layer of silicon rubber pad are mounted sequentially from the bottom up in the cavity, the interior of the top cover (14) is provided with a bulge, the bulge presses an uppermost layer of silicon rubber pad, the top cover (14) is buckled on the internal box (18), the top cover (14) and the internal box (18) can slide relatively, the internal box (18) and the bottom cover (20) can slide relatively, a plurality of O-shaped sealing rings (23) are mounted between the wall surfaces of the top cover (14) and the internal box (18) and between the wall surfaces of the internal box (18) and the bottom cover (20) for sealing, and the belleville springs (19) are mounted between the lower part of the internal box (18) and the bottom cover (20) and configured to tightly press the internal box (18) and the top box (14) of the energy-collecting module.

In the shock-absorbing and energy-collecting roller cage shoe, the main energy-collecting module (6) also includes a lifting lug (15), the lifting lug (15) is fixed on the top cover (14), the lifting lug (15) is articulated with one end of a connecting rod (12), the other end of the connecting rod (12) is articulated with the roller (11), and the roller (11) can swing up and down around the lifting lug (15), playing the role of shock absorption and energy transmission.

In the shock-absorbing and energy-collecting roller cage shoe, two side-by-side supporting rollers (21) are fixed on the top cover (14) of each auxiliary energy-collecting module (10), and the two supporting rollers (21) press the roller (11), not only are favorable for the rotation of the roller (11), but also can transmit the vibrational energy of the roller (11).

In the shock-absorbing and energy-collecting roller cage shoe, the base (7) is of a T-shaped structure, the main energy-collecting module (6) is connected into a raised part of the structure through the wire rope shock absorber, and the two auxiliary energy-collecting modules are mounted in an upper wing and a lower wing of the T-shaped structure.

Compared with the prior art, the present invention proposes to use the wire rope shock absorbers to replace springs to achieve the shock-absorbing effect of the roller cage shoe without changing the original function of the roller cage shoe, so that the lifting container is more stable during operation; moreover, on the basis of meeting the function, the energy-collecting modules are added to collect vibrational energy generated by transverse vibration in the operation process of the lifting container, and convert this part of vibrational energy into collectable piezoelectric energy, this part of piezoelectric energy can supply electric energy to electricity-consuming installations, such as the illumination of the lifting container, and thereby the collection and utilization of energy are realized.

1. Lifting container, 2. Articulated top plate, 31. Left roller cage shoe, 32. Forward roller cage shoe, 33. Right roller cage shoe, 4. Cage guide way, 5. Propping pillar, 6. Main energy-collecting module, 7. Base, 8. Reinforcing plate, 9. Wire rope shock absorber, 10. Auxiliary energy-collecting module, 11. Roller, 12. Connecting rod, 13. Through hole, 14. Top cover, 15. Lifting lug, 16. Silicon rubber pad, 17. Piezoelectric ceramic plate, 18. Internal box, 19. Belleville spring, 20. Bottom cover, 21. Supporting roller, 22. Cage guide, 23. O-shaped sealing ring.

DETAILED DESCRIPTION

The present invention is described in detail below in reference to specific embodiments.

Figure 1:
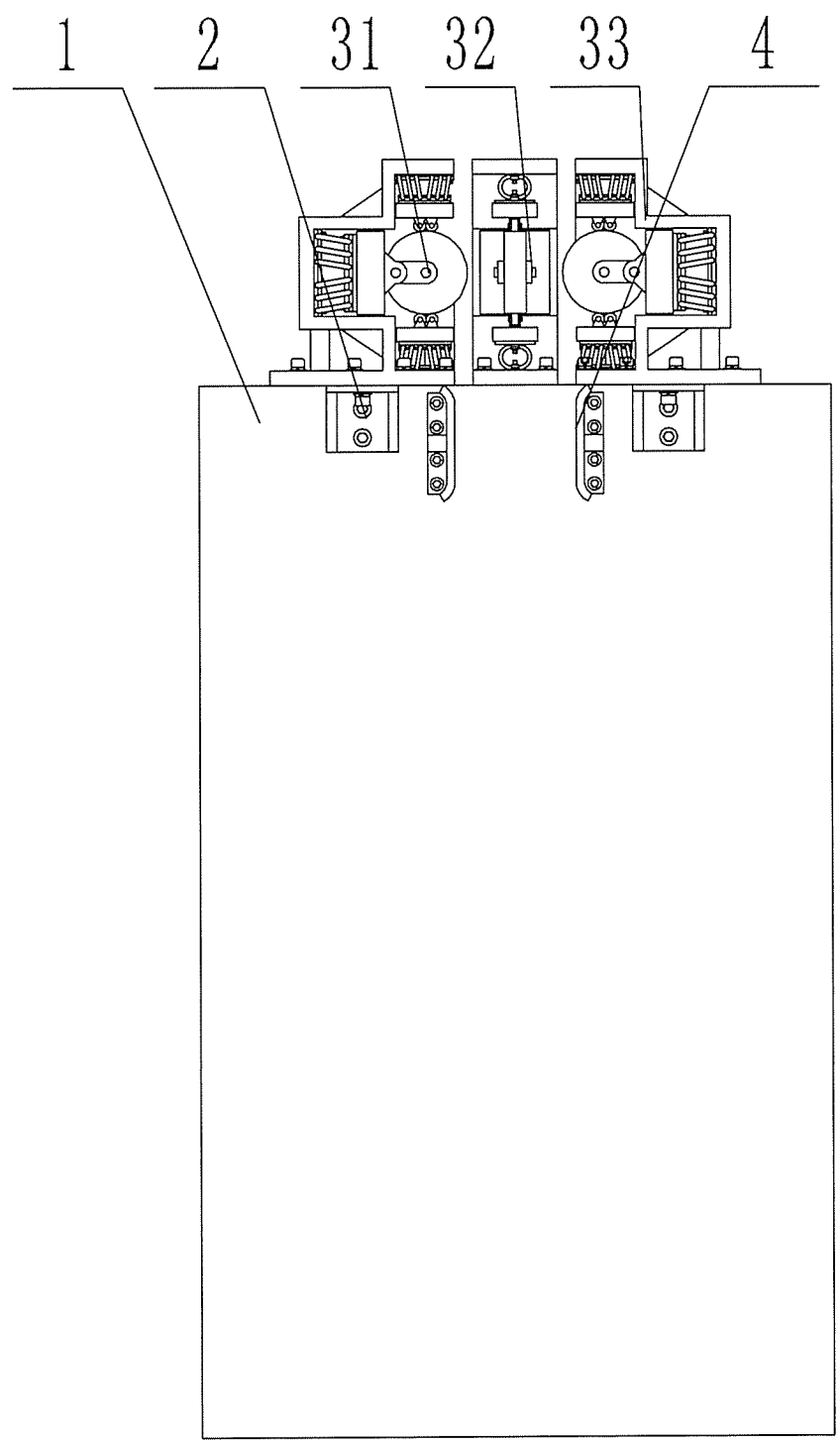
FIG. 1 is a left mounting view of a roller cage shoe.
Figure 2:
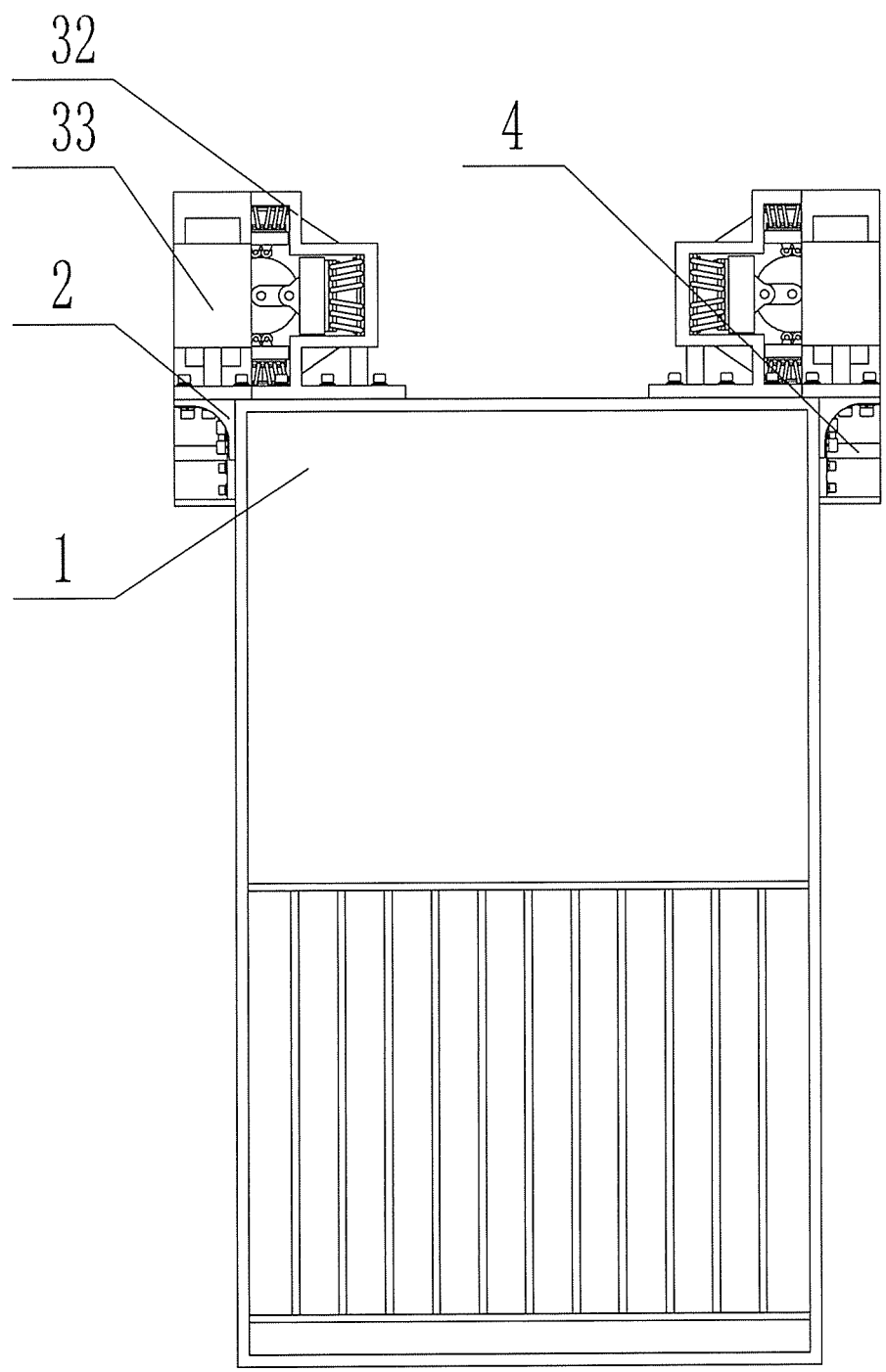
FIG. 2 is a front mounting view of the roller cage shoe.
Figure 3:
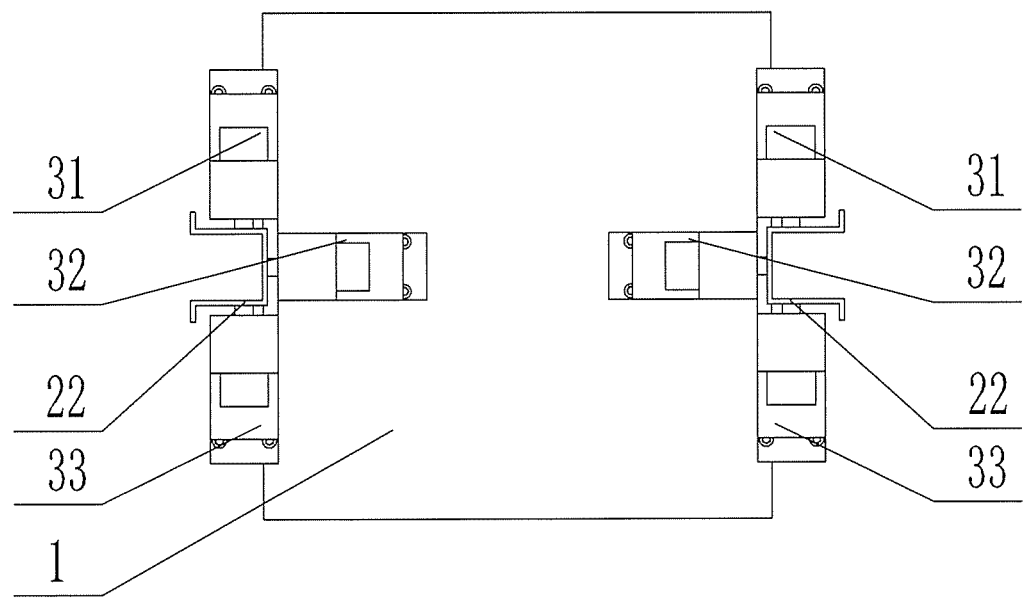
FIG. 3 is a top mounting view of the roller cage shoe.
Figure 4:
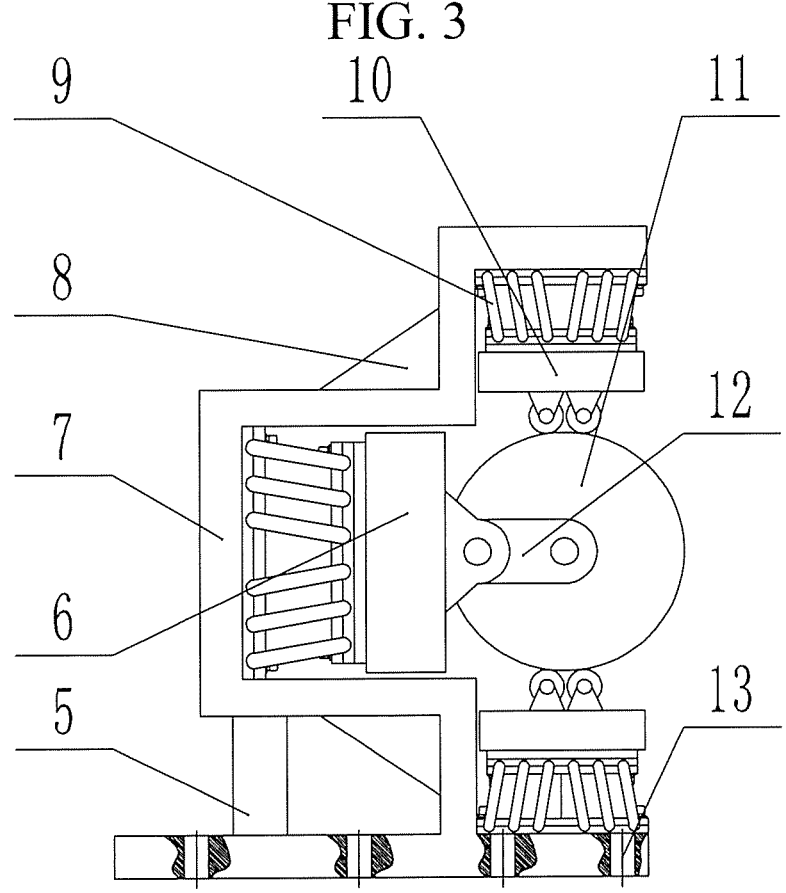
FIG. 4 is a left view of the roller cage shoe.
Figure 5:
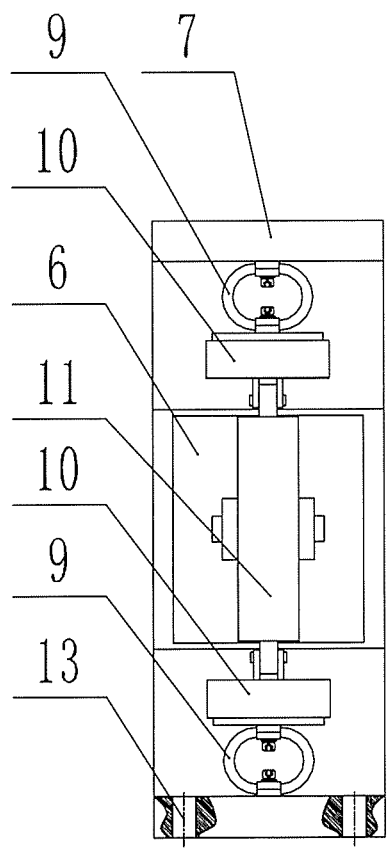
FIG. 5 is a front view of the roller cage shoe.
Figure 6:
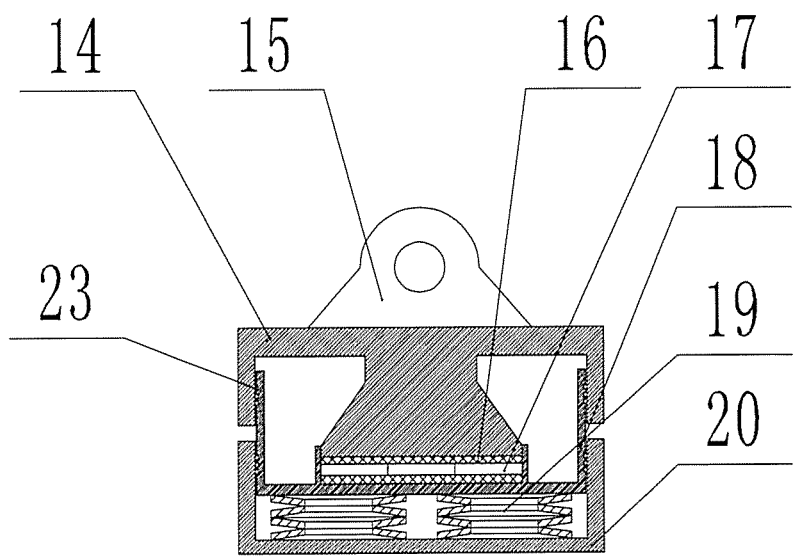
FIG. 6 is a sectional view of a main energy-collecting module.
Figure 7:
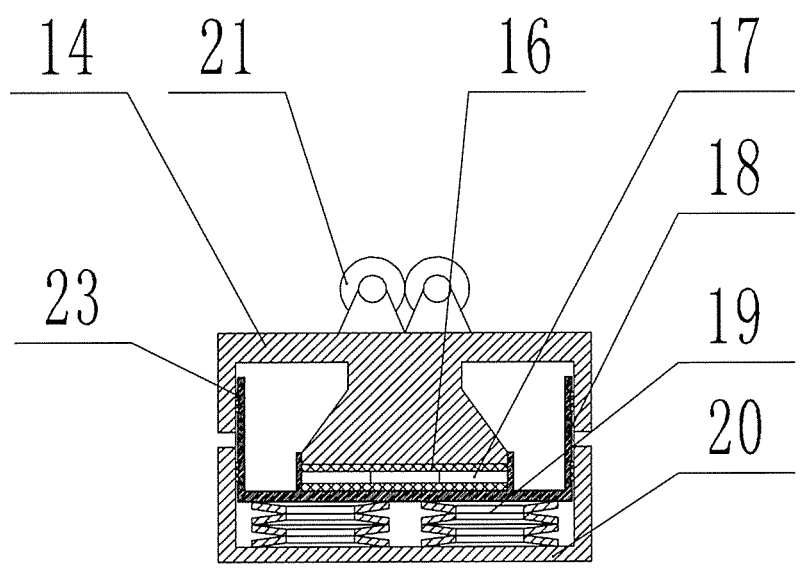
FIG. 7 is a sectional view of an auxiliary energy-collecting module.

Refer to FIG. 1 to FIG. 7, disclosed is a shock-absorbing and energy-collecting roller cage shoe, which includes a base 7, a main energy-collecting module 6, two auxiliary energy-collecting modules 10, and a roller 11, the base 7 is provided with three containing spaces for containing the main energy-collecting module 6 and the two auxiliary energy-collecting modules 10, in the three containing spaces, the main energy-collecting module 6 and the two auxiliary energy-collecting modules 10 are respectively connected fixedly to the base 7 through a plurality of wire rope shock absorbers, the main energy-collecting module 6 and the two auxiliary energy-collecting modules 10 are respectively pressed on the left side, the upper side and the lower side of the roller 11, and the right side of the roller 11 is pressed on a cage guide 22. As a lifting container on which the roller cage shoes are mounted moves up or down along the cage guides 22, not only can the roller cage shoes play a good shock-absorbing role, but also the vibrational energy of the cage guides 22 can be transmitted to the main energy-collecting module 6 and the two auxiliary energy-collecting modules 10 for collection via the roller 11.

The main energy-collecting module 6 includes a top cover 14, a lifting lug 15, a plurality of silicon rubber pads 16, a plurality of piezoelectric ceramic plates 17, an internal box 18, a plurality of belleville springs 19, and a bottom cover 20, the bottom of the internal box 18 is provided with a cavity, one of the silicon rubber pads, the piezoelectric ceramic plates 17 and the other silicon rubber pads are arranged sequentially from the bottom up in the cavity, the interior of the top cover 14 is provided with a bulge, the bulge presses an uppermost layer of silicon rubber pad, the top cover 14 is buckled on the internal box 18, the top cover 14 and the internal box 18 can slide relatively, the internal box 18 and the bottom cover 20 can slide relatively, a plurality of O-shaped sealing rings 23 are mounted between the wall surfaces of the top cover 14 and the internal box 18 and between the wall surfaces of the internal box 18 and the bottom cover 20 for sealing, and the belleville springs 19 are mounted between the lower part of the internal box 18 and the bottom cover 20 and configured to tightly press the internal box 18 and the top box 14 of the energy-collecting module. The lifting lug 15 is mounted on the top cover 14, the lifting lug 15 is articulated with one end of a connecting rod 12, the other end of the connecting rod 12 is articulated with the roller 11, and consequently the roller 11 can swing up and down around the lifting lug 15 by small amplitude, playing the role of shock absorption and energy transmission.

What is different from the main energy-collecting module 6 is that two side-by-side supporting rollers 21 are fixed on the top cover 14 of each auxiliary energy-collecting module 10, and the two supporting rollers 21 press the roller 11, not only are favorable for the rotation of the roller 11, but also can transmit the vibrational energy of the roller 11.

The base 7 is of a T-shaped structure, the main energy-collecting module 6 is connected into a raised part of the structure through the wire rope shock absorber, and the two auxiliary energy-collecting modules are mounted in an upper wing and a lower wing of the T-shaped structure.

The reinforcing plate 8 is configured to enhance the strength of the base 7, a propping pillar 5 is configured to help support the raised part, and the bottom of the base 7 is provided with a through hole, which is configured to fix the base 7 on the top of the lifting container 1.

In the process of use, a left roller cage shoe 31, a forward roller cage shoe 32 and a right roller cage shoe 33 which have the above-mentioned shock-absorbing and energy-collecting structure of the present invention are fixed on the lifting container 1 to respectively act on the left side, the front and the right side of each cage guide 22 to perform shock absorption and energy collection, and during operation, transverse vibration is generated as the cage guides are in contact with the rollers (11). The action of the transverse vibration signal of the lifting container on the piezoelectric ceramic plates (17) can be enhanced by the structure of the novel shock-absorbing and energy-collecting roller cage shoe, the piezoelectric ceramic plates (17) under the action of pressure generate piezoelectric energy, and the generated piezoelectric energy can be collected by energy-collecting cards and used to increase electricity supplied to electrified facilities in the lifting container (1).

It should be understood that those skilled in the art can make improvements or transformations according to the above-mentioned description, and all these improvements and transformations shall fall within the protection scope of the claims attached to the present invention.

What is claimed is:

1. A shock-absorbing and energy-collecting roller cage shoe, comprising a base, a main energy-collecting module, two auxiliary energy-collecting modules, and a roller, wherein the base is provided with three containing spaces for containing the main energy-collecting module and the two auxiliary energy-collecting modules, wherein, in the three containing spaces, the main energy-collecting module and the two auxiliary energy-collecting modules are respectively connected fixedly to the base through a plurality of wire rope shock absorbers, the main energy-collecting module and the two auxiliary energy-collecting modules are respectively pressed on a left side, an upper side and a lower side of the roller, and a right side of the roller is pressed on a cage guide, wherein two side-by-side supporting rollers are fixed on a top cover of the auxiliary energy-collecting module, and the two supporting rollers press the roller not only to facilitate a rotation of the roller but also to transmit the vibrational energy of the roller.

2. The shock-absorbing and energy-collecting roller cage shoe according to claim 1, wherein each of the main energy-collecting module and the two auxiliary energy-collecting modules comprises a top cover, a plurality of silicon rubber pads, a plurality of piezoelectric ceramic plates, an internal box, a plurality of belleville springs, and a bottom cover, wherein the bottom of the internal box is provided with a cavity, a bottom layer of silicon rubber pad, the piezoelectric ceramic plates and an upper layer of silicon rubber pad are mounted sequentially from the bottom up in the cavity, the interior of the top cover is provided with a bulge, the bulge presses an uppermost layer of silicon rubber pad, the top cover is buckled on the internal box, the top cover and the internal box can slide relatively, the internal box and the bottom cover are able to slide relatively, a plurality of O-shaped sealing rings are mounted between wall surfaces of the top cover and the internal box and between wall surfaces of the internal box and bottom cover for sealing, and the belleville springs are mounted between a lower part of the internal box and the bottom cover and configured to tightly press the internal box and the top box of the energy-collecting module.

3. The shock-absorbing and energy-collecting roller cage shoe according to claim 1, wherein the main energy-collecting module further comprises a lifting lug, the lifting lug is fixed on a top cover, the lifting lug is articulated with one end of a connecting rod, the other end of the connecting rod is articulated with the roller, and the roller is able to swing up and down around the lifting lug to provide effects of shock absorption and energy transmission.

4. The shock-absorbing and energy-collecting roller cage shoe according to claim 1, wherein the base is of a T-shaped structure, the main energy-collecting module is connected into a raised part of the T-shaped structure through the correspondingly wire rope shock absorber, and the two auxiliary energy-collecting modules are mounted in an upper wing and a lower wing of the T-shaped structure.

* * * * *